2,913,447
Patented Nov. 17, 1959

2,913,447

RECOVERY OF INERT DILUENTS USED IN THE PREPARATION OF HIGH MOLECULAR WEIGHT POLYETHYLENE

Ernst Jacob, Hofheim (Taunus), Kurt Meyer and Siegfried Sommer, Frankfurt am Main, Germany, assignors, by mesne assignments, to Hercules Powder Company Incorporated, Wilmington, Del., a corporation of Delaware No Drawing. Application April 10, 1956
Serial No. 577,210

Claims priority, application Germany April 16, 1955

6 Claims. (Cl. 260—94.9)

This invention relates to the recovery of the inert diluent used in the preparation of high molecular weight polyethylene and, more particularly, to the process of purifying the diluent used to remove the catalyst residues and make it suitable for re-use in the polymerization process.

In Belgian Patent 533,362 which corresponds to German patent applications Z 3799, Z 3862 and Z 3882 IVc/39c, in Belgian Patent 534,792 which corresponds to German patent application Z 3941 IVc/39c, and in Belgian Patent 534,888 which corresponds to German patent application Z 3942 IVc/39c, of Karl Ziegler, there is described a process for the preparation of high molecular weight polyethylenes. By the process described in these patents and patent applications, ethylene is contacted under relatively mild conditions of pressure and temperature with mixtures of alkali metal, alkaline earth metal, or earth metal organometallic compounds and a compound of a metal selected from the group consisting of metals of groups IV–B, V–B, and VI–B of the periodic table, e.g., titanium, zirconium, hafnium, vanadium, niobium, chromium, molybdenum, tungsten, thorium, and uranium. Mixtures of organoaluminum compounds and titanium tetrahalides or zirconium tetrahalides have proved to be especially efficacious for starting the polymerization.

In accordance with the above patents and patent applications, inert dispersing agents, as for example, aliphatic and cycloaliphatic hydrocarbons, aromatic hydrocarbons, and chlorinated aliphatic and chlorinated aromatic hydrocarbons, are employed for the polymerization process because these solvents do not react with the polymerization catalyst and because water and oxygen are relatively insoluble in these compounds. Of particular importance is the use in this process of aliphatic hydrocarbons and cycloaliphatic hydrocarbons, as for example, hexane, heptane, octane, cyclohexane, and mixtures of aliphatic hydrocarbons or petroleum fractions having a boiling point of about 100–250° C. In the polymerization process the polymer is obtained as a finely divided suspension in the diluent and is recovered from the diluent by filtration, centrifugation, etc.

The re-use of the diluent employed in the polymerization process constitutes a very real problem. Inasmuch as hydrocarbons boiling above about 100° C. are generally employed, distillation of the mother liquors obtained from the polymerization process as a means of purifying the diluent for re-use represents a prohibitive cost and, in fact, makes such a means of purification impractical. Furthermore, it has been found that pronounced decomposition is caused by the residual catalyst in the mother liquor when the latter is distilled, thereby making it impossible to re-use the diluent which has been purified only by distillation.

It has now been found that the diluent employed for low pressure polymerization of ethylene by the processes described in the above-mentioned patents and patent applications can be purified and re-used for the polymerization by precipitating the impurities and then separating the diluent from the precipitated impurities. The solvent regenerated by this means, as fully described below, is, in fact, better suited for the aforementioned polymerization process than the freshly distilled product. The precipitation of the impurities, which are mainly organometallic compounds and residues of the heavy metal components, may be effected by means of oxygen or oxygen-containing gases, preferably in the presence of moisture which may be in the form of air and water or aqueous alkalies or acids and more preferably a combination of these agents. For example, the diluent may be treated with an oxygen-containing gas in the presence of water or moisture, as for example, with moist air, or with the oxygen-containing gas and an alkali such as sodium hydroxide, potassium hydroxide, etc., and even more advantageously with a mixture of the oxygen-containing gas and a mineral acid such as sulfuric acid.

The precipitation of the impurities by means of the oxygen-containing gas may be carried out by passing the gas through the diluent or simply by agitating the diluent in the presence of air or other oxygen-containing gas. Moist air or other moist oxygen-containing gas may be used, or water or aqueous alkali or acid may be added to the diluent which is then treated with the oxygen-containing gas by agitation or other means of incorporating the oxygen and bring about the precipitation of the impurities. Obviously the treatment of the solvent with the described agents may be carried out by either a batchwise or continuous process. This operation may be carried out at either room temperature or at elevated temperatures. However, excessively high temperatures are disadvantageous in that they may lead to a considerable decomposition of the dissolved catalyst residues such as that encountered when attempts are made to purify the solvent by distillation, and consequently the solvent cannot be re-used for polymerization. Hence, the precipitation of the impurities is advantageously conducted at temperatures below about 80° C. The time required for the reaction will depend upon the manner in which the diluent is contacted with the oxygen and other precipitating agents.

After the precipitation, the deposited impurities are filtered from the solvent and the latter is dried with suitable drying agents. In the case of aliphatic hydrocarbons, the use of potassium hydroxide has proved to be particularly advantageous. It goes without saying that this stage of the process may be effected continuously or batchwise.

The diluents which have been purified in the described manner are free of organometallic compounds and of heavy metal components. As compared with fresh diluents, the purified ones may contain about 0.02–0.04% chlorinated hydrocarbons formed during the polymerization. However, the latter do not interfere with subsequent polymerization.

Example 1

After low pressure polymerization of ethylene carried out in cyclohexane with the use of zirconium tetrachloride and triethylaluminum, the resulting polymer is filtered from the solvent in the absence of air.

Two liters of the impure diluent is treated with air, in a glass flask, for 60 minutes. The particles of the resulting precipitate become increasingly coarse during the air treatment and may then easily be filtered on a paper filter. After the filtration the hydrocarbon is shaken for 30 minutes with 20 g. anhydrous calcium chloride, freed of drying agent by filtration, and re-used for polymerization.

Analysis of the purified cyclohexane yielded: aluminum <0.0001%, zirconium <0.0001%, chlorine=0.03%, water=0.003%.

*Example 2*

An amount of 1,100 liters high-boiling, saturated aliphatic hydrocarbon boiling at 200–220°, obtained from a polymerization conducted with the use of titanium tetrachloride and diethylaluminum monochloride catalyst and previously separated from the polymer by filtration through a bowl-type centrifuge, is pumped into a vessel into which there is simultaneously introduced continuously with rapid stirring 100 liters 0.5% aqueous caustic soda per hour. Three hundred liters per hour of the caustic soda-hydrocarbon mixture is transferred, after a residence time of about 1 hour, from the vessel through a drain situated at the bottom by means of a pump, through a filter and into a continuously operating separator in which the hydrocarbon is separated from the caustic soda by virtue of the difference in density. After this separation the hydrocarbon is dried with solid potassium hydroxide. On further filtration there is obtained a solvent which is again suitable for ethylene polymerization.

Analysis of the purified hydrocarbon yielded: aluminum <0.0001%, titanium <0.0001%, chlorine=0.02%, water=0.002%.

*Example 3*

In a 50-liter pipe circuit equipped with pump, 50 liters of an impure gasoline fraction boiling at 60–90° from a previous ethylene polymerization is mixed, per hour, with 50 liters water, pumped, and continuously discharged. The solvent is separated from water by means of a separator and then dried with potassium hydroxide. It is perfectly re-usable for polymerization.

*Example 4*

The polyethylene produced by the polymerization of ethylene in a saturated aliphatic hydrocarbon such as described in Example 2, using titanium tetrachloride and aluminum sesquichloride as catalyst, was separated from the diluent by filtration in the absence of air.

To 2 liters of the diluent recovered as filtrate was added 100 ml. of 96% sulfuric acid and the mixture was then agitated for ½ hour in the presence of air at 20–25° C. Agitation was stopped and the mixture was allowed to settle for 5 minutes and the acid layer was withdrawn. The hydrocarbon layer was then washed twice with one-half its volume of cold water and the water layer separated, after which the hydrocarbon diluent was slurried with 2.5% by weight of the commercial drying agent known as "Super-Filtrol." On filtration there was then obtained a diluent which was again suitable for use in the ethylene polymerization process.

A polymerization vessel was charged with 800 ml. of the above purified diluent and after purging the vessel with nitrogen, 5.45 g. of a titanium trichloride suspension containing 2.01 millimoles of trivalent titanium per gram was added. The diluent and catalyst suspension were agitated and ethylene was passed in while raising the temperature of the reaction mixture to about 80° C. A solution of ethylaluminum sesquichloride was then charge in increments to continue the reaction for a period of about 6 hours, a total of 0.70 g. of ethylaluminum sesquichloride being added. The polymerization was then stopped by adding a mixture of 16 ml. of butanol in 100 ml. of the saturated aliphatic hydrocarbon. After cooling the polymerization mixture to room temperature, the solvent layer was decanted and the polymer was suspended in 1 liter of a 4% aqueous sodium hydroxide solution and agitated for 10 minutes. At the end of that time, the polymer was separated by filtration and steam distilled for about 4–5 hours to remove the residual butanol and aliphatic hydrocarbon. The polymer was then separated by filtration, washed with hexane and methanol and finally was dried in a vacuum oven at 80° C. overnight. From this polymerization there was obtained 388 g. of a polyethylene having a reduced specific viscosity of 2.6 (determined on an 0.1% solution of the polymer in Decalin at 135° C.) and a bulk density of 0.36.

The periodic table referred to in the specification and claims is given in the "Handbook of Chemistry and Physics," published by the Chemical Rubber Publishing Company, pages 392–393 of the 36th edition.

What we claim and desire to protect by Letters Patent is:

1. In the process of polymerizing ethylene by contacting ethylene in an inert liquid organic diluent selected from the group consisting of aliphatic, cycloaliphatic, and aromatic hydrocarbons and chlorinated aliphatic and aromatic hydrocarbons, with a catalyst formed by mixing an organometallic compound of a metal selected from the group consisting of alkali metals, alkaline earth metals, and earth metals with a compound of a metal selected from the group consisting of metals of groups IV–B, V–B and VI–B of the periodic table, the method of recovering said diluent for re-use in the process which comprises separating the polymer formed in the process from said diluent, reacting the catalyst residue in the diluent with oxygen by intimately mixing the diluent containing said catalyst residues with free oxygen at a temperature below about 80° C., whereby the catalyst residues in said diluent are precipitated, separating said precipitated catalyst residue, and drying the resulting diluent.

2. The process of claim 1 wherein the diluent containing the catalyst residues is reacted with free oxygen in the presence of moisture.

3. The process of claim 2 wherein the reaction with free oxygen in the presence of moisture is carried out at a temperature of from about room temperature to about 80° C.

4. In the process of polymerizing ethylene by contacting ethylene in a liquid aliphatic hydrocarbon diluent with a catalyst formed by mixing an alkylaluminum compound with titanium tetrachloride, the method of recovering said diluent for re-use in the process which comprises separating the polymer formed in the process from said diluent, reacting the catalyst residue in the diluent with oxygen in the presence of moisture by intimately mixing the diluent containing said catalyst residues with free oxygen and moisture at a temperature of from about room temperature to about 80° C., whereby the catalyst residues in said diluent are precipitated, separating said precipitated catalyst residue and drying the resulting diluent.

5. The process of claim 4 wherein the diluent containing catalyst residues is reacted with free oxygen in the presence of aqueous alkali.

6. The process of claim 4 wherein the diluent containing catalyst residues is reacted with free oxygen in the presence of sulfuric acid.

References Cited in the file of this patent

UNITED STATES PATENTS

| | | |
|---|---|---|
| 2,691,647 | Field et al. | Oct. 12, 1954 |
| 2,692,259 | Peters | Oct. 19, 1954 |
| 2,692,261 | Peters et al. | Oct. 19, 1954 |
| 2,731,453 | Field et al. | Jan. 17, 1956 |
| 2,827,447 | Nowlin et al. | Mar. 18, 1958 |
| 2,838,477 | Roelen et al. | June 10, 1958 |

FOREIGN PATENTS

| | | |
|---|---|---|
| 533,362 | Belgium | May 16, 1955 |